(12) United States Patent
Butterworth

(10) Patent No.: US 9,090,023 B2
(45) Date of Patent: Jul. 28, 2015

(54) METHOD FOR FIXING AN ITEM OF EQUIPMENT TO A WALL AND CORRESPONDING TANK

(75) Inventor: James Butterworth, Fontaine (FR)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 13/881,810

(22) PCT Filed: Oct. 10, 2011

(86) PCT No.: PCT/FR2011/052355
§ 371 (c)(1),
(2), (4) Date: Apr. 26, 2013

(87) PCT Pub. No.: WO2012/056139
PCT Pub. Date: May 3, 2012

(65) Prior Publication Data
US 2013/0213972 A1    Aug. 22, 2013

(30) Foreign Application Priority Data

Oct. 27, 2010 (FR) ...................................... 10 58813

(51) Int. Cl.
*E04B 2/00* (2006.01)
*E04F 13/00* (2006.01)
(Continued)

(52) U.S. Cl.
CPC ................. *B29C 65/48* (2013.01); *C08J 9/365* (2013.01); *C09J 7/0289* (2013.01); *F17C 1/005* (2013.01);
(Continued)

(58) Field of Classification Search
CPC ............ B29K 2015/04; B29L 2009/00; B32B 15/08; B32B 15/14; B32B 27/00; B32B 27/06; B32B 27/065; B32B 27/08; B32B 27/28; B32B 37/12; B29C 66/51; B29C 65/48
USPC .............. 156/60, 71, 77, 78, 293, 294, 303.1, 156/308.2, 309.6, 306.6, 324.4, 325
See application file for complete search history.

(56) References Cited

U.S. PATENT DOCUMENTS 2,850,397 A * 9/1958 Dereich ........................ 106/610
4,437,893 A * 3/1984 Krinski et al. ................ 106/617
(Continued)

FOREIGN PATENT DOCUMENTS

DE         23 46 694       3/1975
DE    10 2004 061027       6/2006
(Continued)

OTHER PUBLICATIONS

International Search Report and Written Opinion for PCT/FR2011/052355, mailed Mar. 29, 2012.
(Continued)

*Primary Examiner* — Philip Tucker
*Assistant Examiner* — Brian R Slawski
(74) *Attorney, Agent, or Firm* — Christopher J. Cronin

(57) ABSTRACT

The invention relates to a method for fixing an item of equipment to the inner surface of a wall of a cryogenic fluid line or a tank and in particular a tank intended to contain liquid oxygen, the method being characterized in that a layer of porous material is interposed between the wall and the item of equipment.

9 Claims, 1 Drawing Sheet

(51) Int. Cl.
 *B29C 65/00* (2006.01)
 *B32B 3/00* (2006.01)
 *B32B 5/00* (2006.01)
 *B32B 5/18* (2006.01)
 *B32B 37/00* (2006.01)
 *C08J 5/00* (2006.01)
 *C09J 5/10* (2006.01)
 *C09J 5/02* (2006.01)
 *B29C 65/48* (2006.01)
 *C08J 9/36* (2006.01)
 *C09J 7/02* (2006.01)
 *F17C 13/04* (2006.01)
 *F17C 1/00* (2006.01)

(52) U.S. Cl.
 CPC ........... *F17C 13/04* (2013.01); *C08J 2201/038* (2013.01); *C08J 2207/02* (2013.01); *C09J 2427/006* (2013.01); *F17C 2203/012* (2013.01); *F17C 2205/0391* (2013.01); *F17C 2209/227* (2013.01); *F17C 2221/011* (2013.01); *F17C 2221/031* (2013.01); *F17C 2223/0161* (2013.01); *F17C 2250/0408* (2013.01); *F17C 2250/0439* (2013.01)

(56) References Cited

U.S. PATENT DOCUMENTS

| | | | |
|---|---|---|---|
| 4,624,860 A * | 11/1986 | Alber et al. | 427/544 |
| 7,811,406 B1 | 10/2010 | Pontius | |
| 2004/0074240 A1 | 4/2004 | Robbie et al. | |
| 2009/0155648 A1 | 6/2009 | Lee et al. | |

FOREIGN PATENT DOCUMENTS

| | | |
|---|---|---|
| EP | 1 876 382 | 1/2008 |
| FR | 2 919 852 | 2/2009 |
| FR | 2 932 243 | 12/2009 |
| FR | 2 938 267 | 5/2010 |
| FR | 2 941 678 | 8/2010 |

OTHER PUBLICATIONS

French Search Report and Written Opinion for FR1058813, mailed Apr. 12, 2011.

\* cited by examiner

METHOD FOR FIXING AN ITEM OF EQUIPMENT TO A WALL AND CORRESPONDING TANK

CROSS-REFERENCE TO RELATED APPLICATIONS

This application is a §371 of International PCT Application PCT/FR2011/052355, filed Oct. 10, 2011, which claims §119(a) foreign priority to French Patent Application 1058813, filed Oct. 27, 2010.

BACKGROUND

1. Field of the Invention

The present invention relates to a method for fixing a device to a wall, and to a corresponding tank.

The invention relates notably to a method for fixing a device to the internal surface of a wall of a duct or of a for tank cryogenic fluid and in particular of a tank intended to contain liquid oxygen.

The invention may relate more particularly to a bonding-based fixing system for mounting devices inside a cryogenic tank containing or being able to contain liquid oxygen or air. Such a tank may, for example, form part of a space launcher or of any other liquid oxygen storage or transportation system. The device to be fixed in the tank may be, for example, one or more measuring devices (such as temperature or level probes, etc.), piping, deflectors or any other device for monitoring or measuring the displacement of the fluids inside the tank.

The invention can in particular be used for the mounting, in a tank, of a deflecting wall such as that described in the documents FR2919852 or FR2941678.

The invention may also be applied to devices mounted on any system that may be exposed to liquid oxygen or air, such as ducts for cryogenic fluids.

2. Related Art

Techniques are known for fixing to the walls of cryogenic containers and ducts by mechanical fastening, by welding/brazing and by bonding. Depending on the geometry of the wall, the fixing by mechanical fastening may require modifications of said wall (for example, drilling of holes, added support, etc.) and an impairment of its properties such as the seal-tightness, mechanical strength or weight. Fixing by welding is applicable only to certain pairings of materials and often requires a modification of the geometry of the wall, especially if the latter is of small thickness. The high temperatures that are required may result in an impairment of the properties of the materials. Fixing by bonding is generally more versatile than the preceding techniques. It can be used to couple a large number of homogeneous or heterogeneous materials and its application is relatively simple. It does not require any modification of the geometry of the wall.

Now, the constraints associated with the embrittlement of the materials at low temperature and with the differential thermal contraction between the bond and the materials to be bonded make the selection of a bond particularly critical for cryogenic applications. Some bonds, in particular certain epoxies, silicones and urethanes, are known for their applications in cryogenics. However, these bonds are not chemically compatible with powerful oxidizers such as liquid oxygen, which results in a significant risk of combustion when additional energy is applied such as a mechanical impact or an electrostatic discharge.

Most of the plastic materials and adhesives used for mounting devices in tanks pose safety problems because these materials are liable to generate a fire when they are exposed to a powerful oxidizer such as liquid oxygen. Bonding the devices inside a liquid oxygen tank requires a rigorous selection of the materials used and of the mounting structure.

SUMMARY OF THE INVENTION

One aim of the present invention is to overcome all or some of the drawbacks of the prior art mentioned above.

To this end, the method according to the invention, also conforming to the generic definition given thereof by the above preamble, is essentially characterized in that a layer of porous material is interposed between the wall and the device.

Moreover, embodiments of the invention may comprise one or more of the following characteristics:

- the layer of porous material is fixed to the wall then the device is fixed to the layer of porous material,
- the device is fixed to the layer of porous material then the layer of porous material is fixed to the wall,
- the layer of porous material has a first surface which is fixed to the wall and a second surface to which the device is fixed,
- the layer of porous material is fixed to the wall of the tank by bonding,
- the layer of porous material is fixed to the wall of the tank by bonding by means of an inorganic resin such as an aqueous solution of sodium silicate and/or an aqueous solution of potassium silicate,
- the layer of porous material comprises or consists of at least one of the following materials: an expanded insulating plastic, an expanded polymer, expanded polytetrafluoroethylene (PTFE), filament or sintered polytetrafluoroethylene (PTFE),
- the device comprises at least one out of: a piping element, a deflecting wall, a measuring appliance such as a temperature sensor or a level sensor or a pressure sensor, a structural element such as a support or a reinforcement,
- the face of the device fixed to the layer of porous material consists of at least one of the following materials: a metallic material, ceramic, a polymer, a vitreous material, a crystalline material,
- the device is fixed to the layer of porous material by bonding by means of a resin such as an inorganic resin,
- the face of the device fixed to the layer of porous material comprises a film or a layer of fabric comprising an insulating polymer such as a fluoropolymer, notably polytetrafluoroethylene (TEFLON®), the film or the layer being fixed to the layer of porous material by heat-sealing,
- the layer of porous material constitutes a structural support (preferably the only structural support) for the device.

The invention also relates to a tank or a duct, in particular for liquid oxygen, obtained according to this method, and their use.

The invention relates in particular to a cryogenic fluid tank comprising a fluid storage volume delimited by a wall and a device fixed to the surface of said wall forming the internal tank surface, characterized in that the device is fixed to the wall indirectly via a layer of porous material interposed between the wall and the device.

The invention also relates to a space launcher comprising a tank.

The invention may also relate to any alternative device or method comprising any combination of the characteristics hereinabove or hereinbelow.

The invention relates in particular to a fixing for a device that uses the association of an intermediate layer of porous material made of expanded PTFE bonded via an inorganic bond. Against all expectations, this fixing ensures a mechanical strength for the device on the wall and is compatible with a liquid oxygen environment.

BRIEF DESCRIPTION OF THE FIGURES

Other particular features and advantages will become apparent from reading the following description, given with reference to the figures in which.

DETAILED DESCRIPTION OF THE INVENTION

Figure 1:
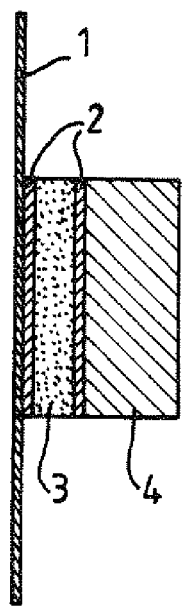
FIG. 1 represents a schematic and partial cross section of a first exemplary fixing of a device to the wall of a tank according to the invention.

Referring to FIG. 1, the fixing system comprises the two surfaces that have to be attached to one another: on the one hand the wall 1 of a tank (or of a duct, or of any other container) and, on the other hand, the surface of a device 4.

According to an advantageous feature, a layer 3 of porous material is inserted between the two elements 1, 4 to be joined.

Preferably, the layer 3 of porous material is fixed to the wall 1 by bonding with an inorganic resin 2. Similarly, preferably, the device 4 is fixed to the layer 3 of porous material by bonding with an inorganic resin 2.

The porous material of the layer 3 thus makes it possible to dispel vapours originating from the evaporation of the solvent present in the bonding resin 2.

The inorganic resin 2 used may be, for example, based on an aqueous solution of sodium silicates or possibly potassium silicates.

The porous material forming the layer 3 is preferably expanded PTFE.

This porous material 3 is preferably bonded to the fixed wall 1 using a layer 2 of inorganic resin.

The surface to be fixed of the device 4 may be metallic, ceramic, polymeric, vitreous or crystalline. As represented in FIG. 1, this surface can be bonded to the porous material 3 using a layer of inorganic resin 2.

Figure 2:
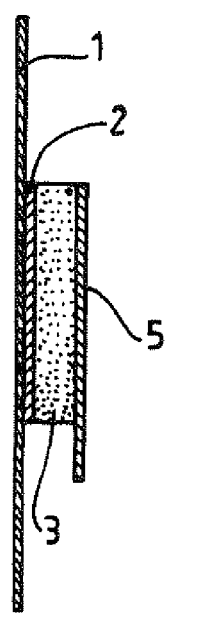
FIG. 2 represents a schematic and partial cross section of a second exemplary fixing of a device to the wall of a tank according to the invention.

Alternatively, and as partially represented in FIG. 2, the device (which is not represented in FIG. 2) may comprise a film 5 or a fabric coated with fluoropolymer. This face comprising this film 5 (or fabric or any other compatible material) can be heat-sealed directly onto the layer 3 of porous material made of expanded PTFE. In other words, the device 4 is fixed to the layer 3 of porous material before this layer 3 of porous material is bonded to the fixed wall 1.

Preferably, the joining structure uses only materials which have been demonstrated to be compatible with liquid oxygen under the force of a mechanical impact according to the French standard NF EN 1797.

The layer 3 of porous material has, for example, a thickness of between 3 and 20 mm and preferably between 6 and 10 mm.

Similarly, the resin bonding layer or layers 2 have, for example, a thickness of between 0.01 mm and 5 mm and more particularly between 0.1 mm and 1 mm.

As well as having a structure that is simple and inexpensive, the invention provides for a reliable, rigid and totally safe fixing, in particular when the fixing system is subject to an environment containing a high proportion of liquid and/or gaseous oxygen.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a non-exclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method for fixing a device on the internal surface of a wall of a cryogenic liquid oxygen tank, comprising the step of fixing a device to a wall forming an internal surface of a liquid oxygen tank, wherein:
    the device is fixed to the wall indirectly via a layer of porous material interposed between the wall and the device by bonding the layer of porous material to the internal surface with an inorganic resin and bonding the device to the layer of porous material with the inorganic resin;
    the porous material being selected from the group consisting of: expanded polytetrafluoroethylene, filament polytetrafluoroethylene, and sintered polytetrafluoroethylene;
    the device comprises at least one out of:
        a piping element;
        a deflecting wall;
        a measuring appliance comprising a temperature sensor or a level sensor or a pressure sensor; and
        a structural element chosen from a support or a reinforcement.

2. The method of claim 1, wherein the layer of porous material is fixed to the wall then the device is fixed to the layer of porous material.

3. The method of claim 1, wherein the device is fixed to the layer of porous material then the layer of porous material is fixed to the wall.

4. The method of claim 1, wherein the layer of porous material has a first surface which is fixed to the wall and a second surface to which the device is fixed.

5. The method of claim 1, wherein the face of the device fixed to the layer of porous material consists of at least one of materials selected from the group consisting of a metallic material, a ceramic, a polymer, a vitreous material, and a crystalline material.

6. The method of claim 1, wherein the fixing by bonding forms a bonding layer having a thickness of between 0.01 mm and 5 mm.

7. The method of claim 6, wherein the fixing by bonding forms a bonding layer having a thickness of between 0.1 mm and 1 mm.

8. The method of claim 1, wherein the face of the device fixed to the layer of porous material comprises a film or a layer of fabric comprising polytetrafluoroethylene, the film or the layer being fixed to the layer of porous material by heat-sealing.

9. The method of claim 1, wherein the inorganic resin is an aqueous solution of sodium silicate and/or an aqueous solution of potassium silicate.

* * * * *